(12) United States Patent
Roest

(10) Patent No.: US 6,665,031 B2
(45) Date of Patent: Dec. 16, 2003

(54) DISPLAY DEVICE

(75) Inventor: Wouter Roest, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 339 days.

(21) Appl. No.: 09/888,148

(22) Filed: Jun. 22, 2001

(65) Prior Publication Data

US 2002/0021499 A1 Feb. 21, 2002

(30) Foreign Application Priority Data

Jun. 23, 2000 (EP) .............................................. 00202196

(51) Int. Cl.[7] ............................................ G02F 1/3335
(52) U.S. Cl. ................ 349/115; 349/8; 349/9; 349/11; 349/96; 349/117; 349/119
(58) Field of Search ........................... 349/8, 9, 11, 96, 349/113, 117, 119, 137, 115

(56) References Cited

U.S. PATENT DOCUMENTS 5,066,108 A  * 11/1991  McDonald .................... 359/65
5,532,852 A  *  7/1996  Kalmanash .................. 359/73

* cited by examiner

*Primary Examiner*—Long Pham
*Assistant Examiner*—Wai-Sing Louie
(74) *Attorney, Agent, or Firm*—Gregory L. Thorne

(57) ABSTRACT

A display device (1) comprising a light modulation panel (2), a first polarization layer (5), a first ¼λ layer (6), a semi-transparent reflective layer (7), a lens (8), a second ¼λ layer (11) and a second polarization layer (12). The first ¼λ layer (6) is situated between the first polarization layer (5) and the semi-transparent reflective layer (7). The second polarization layer (12) is a reflective polarization layer. The display device may include a hologram.

7 Claims, 2 Drawing Sheets

DISPLAY DEVICE

Figure 1:
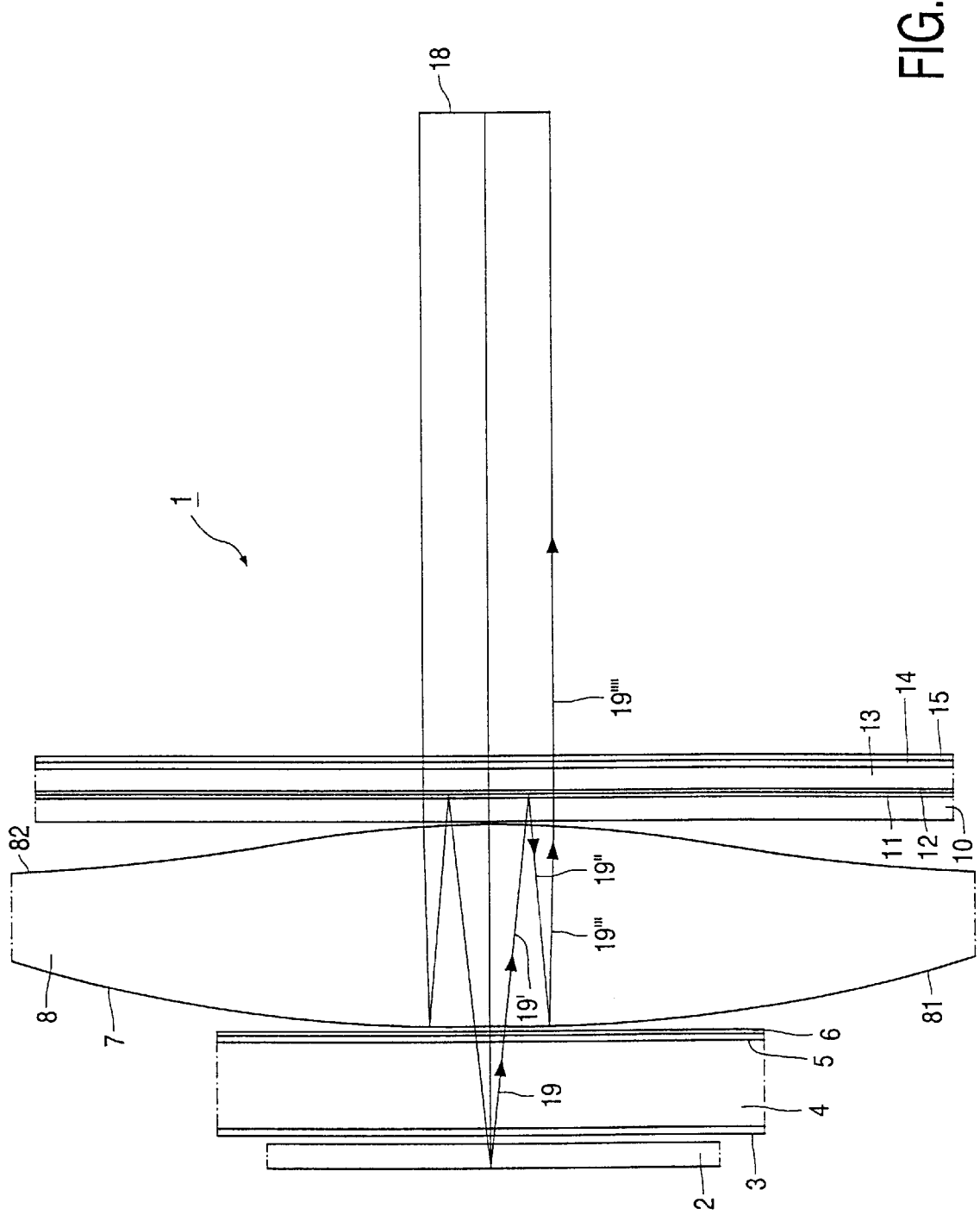

The invention relates to a display device comprising a light modulation panel, a first polarization layer, a semi-transparent reflective layer, a first ¼λ layer, a lens, a second ¼λ layer and a second polarization layer.

Such a display device is used in, for example, head-mounted display devices, HMDs (head-mounted displays) and projection TVs. LCDs which are either transmissive or reflective are regularly used as light modulation panels. With a reflective LCD, the LCD is illuminated from the same side as the side from which it is viewed. With transmissive LCDs, the LCD is illuminated from a different size than that from which it is viewed. Notably for HMDs, the display device should be as thin as possible so that the HMD can be given a relatively compact form.

In such a display device, known from U.S. Pat. No. 5,801,885, the lens is provided with a semi-transparent reflective layer on the side facing the light modulation panel and on the side remote from the light modulation panel. Moreover, the first ¼λ layer is situated between the semi-transparent reflective layer which is situated on a side of the lens facing the light modulation panel and on the side of the lens remote from the light modulation panel.

Moreover, the display device as described in U.S. Pat. No. 5,801,885 is provided with at least a second lens.

A light modulation beam coming from the light modulation panel and to be imaged on the eye is passed by the first semi-transparent reflective layer, reflected by the second semi-transparent reflective layer to the first semi-transparent reflective layer, subsequently also reflected by the first semi-transparent reflective layer and ultimately passed by the second semi-transparent reflective layer.

Whenever the light beam impinges upon a semi-transparent reflective layer, half of the light beam is passed or reflected in an unwanted direction. Since the light beam between the light modulation panel and the eye meets a semi-transparent reflective layer four times, only $(\frac{1}{2})^4 \times \frac{1}{16}$ light beam of the original light beam coming from the light modulation panel can reach the eye.

It is an object of the invention to provide a display device having an improved light output, which display device can be given a light weight and a thin form in a relatively simple manner.

In the display device according to the invention, this object is achieved in that the first ¼λ layer is situated between the first polarization layer and the semi-transparent reflective layer, while the second polarization layer is a reflective polarization layer.

Since the second polarization layer is a reflective polarization layer, either full reflection or full passage of the light beam occurs on this surface. In the display device according to the invention, only a single semi-transparent reflective layer is necessary due to the reflective polarization layer. The first ¼λ layer is to be situated between the first polarization layer and the semi-transparent reflective layer when using a reflective polarization layer.

A light beam coming from the light modulation panel passes through the first semi-transparent reflective layer, reflects on the reflective polarization layer, reflects again on the semi-transparent reflective layer and subsequently passes through the second reflective polarization layer. This means that the light beam impinges upon the semi-transparent reflective layer twice so that $(\frac{1}{2})^2 \times \frac{1}{4}$ of the original light beam coming from the light modulation panel can reach the eye. Consequently, the light output of the display device according to the invention is four times better than that of the display device known from U.S. Pat. No. 5,801,885.

An embodiment of the display device according to the invention is characterized in that the polarization layer and the ¼λ layers are planar.

By giving the polarization layers and the ¼λ layers a planar form, the display device according to the invention can easily be made from foils.

A further embodiment of the display device according to the invention is characterized in that a hologram is situated in front of the lens.

Color errors produced on the refracting surfaces can be corrected by means of the hologram. A larger magnification can then be obtained with the same optical resolution.

These and other aspects of the invention are apparent from and will be elucidated with reference to the embodiments described hereinafter.

Figure 2:
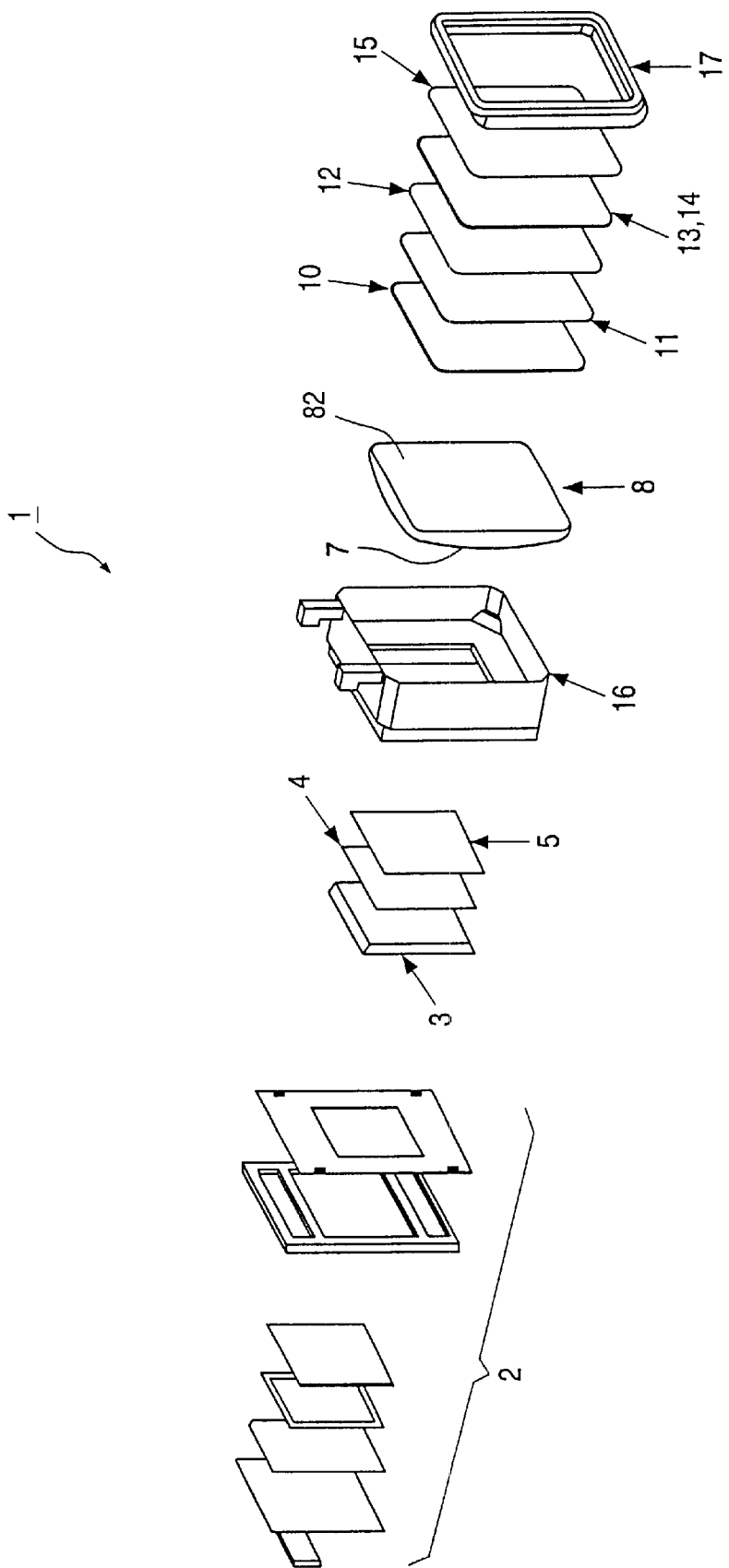

In the drawings:

FIG. 1 is a diagrammatic side elevation of a display device according to the invention, FIG. 2 is an exploded perspective view of the display device shown in FIG. 1.

Corresponding components in the Figures are denoted by the same reference numerals.

FIGS. 1 and 2 show a display device 1 according to the invention, provided with a light modulation panel 2 comprising, for example, a reflective LCD. The light modulation panel 2 is preceded by, consecutively, a compensation layer 3, an illumination device 4, a first polarization layer 5, a first ¼λ layer 6, a semi-transparent reflective layer 7, a lens 8, a glass plate 10, a second ¼λ layer 11, a reflective polarization layer 12, a glass plate 13, a hologram 14 and a third polarization layer 15. The compensation layer 3 is used to intensify contrasts of the light modulation panel 2. The lens 8 is aspherical and has a first lens surface 81 facing the light modulation panel 2 and a second lens surface 82 remote from the light modulation panel 2. The semi-transparent reflective layer 7 is provided on the first lens surface 81.

The glass plates 10 and 13 are used for supporting the foil-shaped ¼λ layer, reflective polarization layer 12, hologram 14 and polarization layer 5. It is of course also possible to use only one glass plate 10 or 14.

The reflective polarization layer 12 may be, for example, a foil made, inter alia, by 3M and marketed under the name of "Dual Brightness Enhancement Film (DBEF)". A similar reflective polarizer is described in U.S. Pat. No. 5,965,247.

The hologram 14, which may comprise, for example, a Fresnel lens, is used to correct color errors produced on the refractive surfaces.

The polarization layer 15 is used to suppress reflection of ambient light on the reflective polarization layer 12.

The display device 1 further comprises a housing 16 accommodating the afore-mentioned components 2 to 15. The housing 16 is closed on a side remote from the light modulation panel 2 by means of a lid 17 having a window. An eye surface 18 is shown on the right-hand side in FIG. 1.

The operation of the display device 1 will be elucidated with reference to FIG. 1.

The illumination device 4 sends light to the light modulation panel 2. This light is modulated in the light modulation panel 2 and subsequently reflected towards the eye surface 18. Such a reflective light beam is denoted by reference numeral 19. The light beam 19 comes from the LCD and is therefore already polarized. Upon its passage through the first ¼λ layer 6, the light beam is rendered circular. The semi-transparent reflective layer 7 passes half the light beam as light beam 19' on the first lens surface 81. The light beam 19' passes through the second ¼λ layer 11 and is reflected on the reflective polarizing layer 12. After reflection, the light beam is again rendered circular upon passage through the second ¼λ layer 11. This light beam is denoted by the reference numeral 19". Of the light beam 19", the part 19'" reflected by the semi-transparent reflective layer 7 is utilized. The light beam 19'" is circularly polarized and becomes linear upon passage through the ¼λ layer 11. However, this linear polarization is now such that transmission now takes place through the reflective polarization layer 12 so that the light of the image now magnified by the lens 8 is incident as light beam 19"" on the eye surface 18.

The virtual image of the light modulation panel 2 may be situated at a distance of approximately 3 meters from the eye surface 18 with an aspherical lens 8 having a magnification of approximately 160 to 220. This gives the impression of a large cinema screen, corresponding to a viewing angle of 73° when a light modulation panel with a diagonal of 1 inch is used.

The lens 8 may be easily made by means of injection molding. It is alternatively possible to integrate the hologram 14 in the lens 8. Since the display device 1 is provided with only one lens 8 and is further provided with planar components, the construction and composition of display device 1 is relatively simple and can be implemented with a relatively high accuracy. Since notably the blue light is not polarized 100% by the illumination device 4, the polarization layer 5 is provided.

The reflective polarization layer is preferably a linear polarization layer which has a broad band and ensures a high contrast. If a retardation layer of a different kind than a ¼λ layer is used, a polarization layer of a different type is alternatively possible. The hologram may be alternatively provided on a different layer.

It is alternatively possible to use a transmissive LCD as a light modulation panel 2. When using a transmissive LCD, the illumination device 4 should be positioned on a side of the LCD remote from the lens 8.

What is claimed is:

1. A display device (1) comprising at least a light modulation panel (2), a first polarization layer (5), a semi-transparent reflective layer (7), a first ¼λ layer (6), a lens (8), a second ¼λ layer (11) and a second polarization layer (12), characterized in that the first ¼λ layer (6) is situated between the first polarization layer (5) and the semi-transparent reflective layer (7), while the second polarization layer (12) is a reflective polarization layer.

2. A display as claimed in claim 1, characterized in that the polarization layers (5, 12) and the ¼λ layers (6, 11) are planar.

3. A display device as claimed in claim 1, characterized in that a hologram is situated in front of the lens (8).

4. A display device as claimed in claim 3, characterized in that the hologram is integrated in the lens (8) on a side remote from the semi-transparent reflective layer.

5. A display device as claimed in claim 1, characterized in that an illumination device (4) is situated between the light modulation panel (2) and the first polarization layer (5).

6. A display device as claimed in claim 1, characterized in that a compensation layer (3) is situated between the light modulation panel (2) and the illumination device (4).

7. A display device as claimed in claim 1, characterized in that the lens (8) is aspherical.

\* \* \* \* \*